US009618145B2

(12) United States Patent
Brown et al.

(10) Patent No.: US 9,618,145 B2
(45) Date of Patent: Apr. 11, 2017

(54) DUCT WITH ELECTRICALLY CONDUCTIVE COATING

(71) Applicant: Hamilton Sundstrand Corporation, Windsor Locks, CT (US)

(72) Inventors: Ricardo O. Brown, West Hartford, CT (US); Gary R. Wysocki, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 384 days.

(21) Appl. No.: 14/231,824

(22) Filed: Apr. 1, 2014

(65) Prior Publication Data
US 2014/0363597 A1 Dec. 11, 2014

Related U.S. Application Data

(60) Provisional application No. 61/833,114, filed on Jun. 10, 2013.

(51) Int. Cl.
*F16L 9/147* (2006.01)
*H05F 3/00* (2006.01)
(Continued)

(52) U.S. Cl.
CPC ............. *F16L 9/147* (2013.01); *B32B 1/08* (2013.01); *B32B 15/08* (2013.01); *B32B 15/20* (2013.01); *C09D 5/24* (2013.01); *E04F 17/00* (2013.01); *E21F 1/04* (2013.01); *F02C 7/00* (2013.01); *F16L 3/26* (2013.01); *F16L 9/003* (2013.01); *F16L 9/01* (2013.01); *F16L 9/12* (2013.01);
(Continued)

(58) Field of Classification Search
CPC ...... F16L 3/26; F16L 9/003; F16L 9/01; F16L 9/12; F16L 9/121; F16L 9/123; F16L 9/125; F16L 9/127; F16L 9/128; F16L 9/133; F16L 9/14; F16L 9/147; F16L 9/18; F16L 11/00; F16L 11/12; F16L 11/127; F16L 11/14; F16L 11/20; E04F 17/00; E21F 1/04; H02G 3/04; H02G 3/0443
See application file for complete search history.

(56) References Cited

U.S. PATENT DOCUMENTS 3,943,273 A    3/1976   de Putter
4,522,432 A *  6/1985   Press .................. B29D 23/008
                                                       138/147
(Continued)

FOREIGN PATENT DOCUMENTS

EP     0310271       4/1988
WO     2009045433    4/2009

OTHER PUBLICATIONS

Entry for "multiple" from dictionary.com, accessed Nov. 17, 2016 (4 pages).*

(Continued)

*Primary Examiner* — Walter B Aughenbaugh
(74) *Attorney, Agent, or Firm* — Carlson, Gaskey & Olds, P.C.

(57) ABSTRACT

A duct includes a polymeric duct wall that circumscribes a fluid-conveyance passage. The polymeric duct wall includes, relative to the fluid-conveyance passage, an inner surface and an outer surface. An electrically conductive coating is disposed on at least one of the outer surface and the inner surface.

13 Claims, 1 Drawing Sheet

(51) Int. Cl.

| | | |
|---|---|---|
| *F16L 11/20* | (2006.01) | |
| *H02G 3/04* | (2006.01) | |
| *E04F 17/00* | (2006.01) | |
| *E21F 1/04* | (2006.01) | |
| *F16L 9/12* | (2006.01) | |
| *F16L 3/26* | (2006.01) | |
| *F16L 9/00* | (2006.01) | |
| *F16L 9/01* | (2006.01) | |
| *F16L 9/133* | (2006.01) | |
| *F16L 9/14* | (2006.01) | |
| *F16L 9/128* | (2006.01) | |
| *F16L 11/00* | (2006.01) | |
| *F16L 9/127* | (2006.01) | |
| *F16L 11/12* | (2006.01) | |
| *F16L 9/18* | (2006.01) | |
| *F16L 11/14* | (2006.01) | |
| *B32B 15/08* | (2006.01) | |
| *B32B 15/20* | (2006.01) | |
| *B32B 1/08* | (2006.01) | |
| *C09D 5/24* | (2006.01) | |
| *F16L 11/127* | (2006.01) | |
| *F02C 7/00* | (2006.01) | |

(52) U.S. Cl.
CPC .............. *F16L 9/121* (2013.01); *F16L 9/123* (2013.01); *F16L 9/125* (2013.01); *F16L 9/127* (2013.01); *F16L 9/128* (2013.01); *F16L 9/133* (2013.01); *F16L 9/14* (2013.01); *F16L 9/18* (2013.01); *F16L 11/00* (2013.01); *F16L 11/12* (2013.01); *F16L 11/127* (2013.01); *F16L 11/14* (2013.01); *F16L 11/20* (2013.01); *H02G 3/04* (2013.01); *H02G 3/0443* (2013.01); *H05F 3/00* (2013.01); *B32B 2307/202* (2013.01); *B32B 2597/00* (2013.01); *F05D 2300/50* (2013.01); *Y10T 428/1352* (2015.01)

(56) References Cited

U.S. PATENT DOCUMENTS

| | | |
|---|---|---|
| 6,176,268 B1 | 1/2001 | Hsich et al. |
| 7,111,646 B2 | 9/2006 | Sato |
| 2006/0042712 A1 | 3/2006 | Iio et al. |
| 2010/0304063 A1* | 12/2010 | McCrea ............... C08J 7/04 428/35.8 |
| 2011/0023985 A1* | 2/2011 | Deregibus ............ F16L 9/121 138/103 |

OTHER PUBLICATIONS

European Search Report for European Patent Application No. 14169704.5, mailed Oct. 17, 2014.

Database WPI, Week 200803, Thomson Scientific, London, GB, Jul. 11, 2007. (abstract).

* cited by examiner

DUCT WITH ELECTRICALLY CONDUCTIVE COATING

CROSS-REFERENCE TO RELATED APPLICATION

This application claims priority to U.S. Provisional Application No. 61/833,114 which was filed on Jun. 10, 2013.

BACKGROUND

Ducts are used in various applications for conveying air or other fluid. Plastic ducts can be readily formed into complex geometries with smooth flow surfaces and duct curvature, for example. A plastic duct can be formed from several plastic layers, with one of the layers including carbon black, carbon fibers or graphite for anti-static properties.

SUMMARY

A duct according to an example of the present disclosure includes a polymeric duct wall circumscribing a fluid-conveyance passage. The polymeric duct wall includes, relative to the fluid-conveyance passage, an inner surface, an outer surface, and an electrically conductive coating disposed on at least one of the outer surface and the inner surface.

In a further embodiment of any of the foregoing embodiments, the electrically conductive coating is disposed on the outer surface.

In a further embodiment of any of the foregoing embodiments, the polymeric duct wall includes polyphenylene sulfide.

In a further embodiment of any of the foregoing embodiments, the polymeric duct wall includes polyetheretherketone.

In a further embodiment of any of the foregoing embodiments, the electrically conductive coating is multi-layered.

In a further embodiment of any of the foregoing embodiments, the electrically conductive coating has multiple layers of different metallic compositions.

In a further embodiment of any of the foregoing embodiments, the electrically conductive coating includes a layer of copper and a layer of nickel.

In a further embodiment of any of the foregoing embodiments, the layer of copper interfaces the outer surface, and the layer of nickel interfaces the layer of copper.

In a further embodiment of any of the foregoing embodiments, the layer of copper has a first average thickness and the layer of nickel has a second average thickness that is less than the first average thickness.

In a further embodiment of any of the foregoing embodiments, the second average thickness that is less than the first average thickness by a factor of at least 2.

In a further embodiment of any of the foregoing embodiments, the electrically conductive coating is grounded.

A further embodiment of any of the foregoing embodiments comprises an electrically conductive bridge extending from the inner surface to the outer surface. The electrically conductive bridge dissipates electric charge from the electrically conductive coating to a grounded component.

A duct according to an example of the present disclosure includes a non-electrically conductive duct wall circumscribing a passage. The non-electrically conductive duct wall includes, relative to the passage, an inner surface and an outer surface, at least one of which collects electric charge, an electrically conductive coating disposed on the surface and which collects the electric charge, and an electrically conductive bridge extending from the inner surface to the outer surface. The electrically conductive bridge dissipates the electric charge from the electrically conductive coating to a grounded component.

In a further embodiment of any of the foregoing embodiments, the electrically conductive bridge is a fastener.

In a further embodiment of any of the foregoing embodiments, the non-electrically conductive duct wall is polymeric.

In a further embodiment of any of the foregoing embodiments, the electrically conductive coating is multi-layered.

A method for dissipating static charge in a duct according to an example of the present disclosure includes collecting electric charge at a surface of a non-electrically conductive duct wall that circumscribes a passage, and dissipating the electric charge from the surface using a grounded electrically conductive coating disposed on the surface.

A further embodiment of any of the foregoing embodiments includes dissipating the electric charge from the electrically conductive coating over an electrically conductive bridge that extends through the non-electrically conductive duct wall.

In a further embodiment of any of the foregoing embodiments, the electrically conductive bridge is a fastener.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Ducts can be used in aerospace or other applications for conveying fluids. Ducts fabricated from polymer composite materials can be painted with electrically conductive paints to satisfy static dissipation requirements. However, the paint does not adhere well and may peel or deform, degrading the conductive surface and ability to dissipate electric charge. Additionally, in the aerospace industry, there may be other structural and weight requirements. The examples herein provide an anti-static duct that can be fabricated with high strength and light weight.

Figure 1:
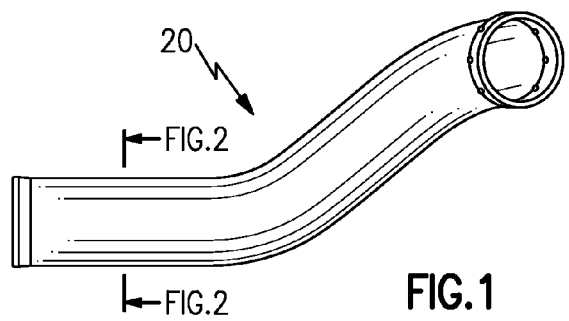
FIG. 1 illustrates an example duct.

FIG. 1 illustrates a portion of an example duct 20 that has anti-static properties. Anti-static properties facilitate the reduction or elimination of build-up of static electric charge, which in this disclosure may simply be referred to as electric charge. The electric charge is produced from friction, known as triboelectric effects, between different materials and can have either positive or negative polarity. Friction between a moving fluid in a duct and the ducts walls may generate electric charge, for example. If allowed to build, the electric charge can dissipate to an oppositely charged or neutral object.

Figure 2:
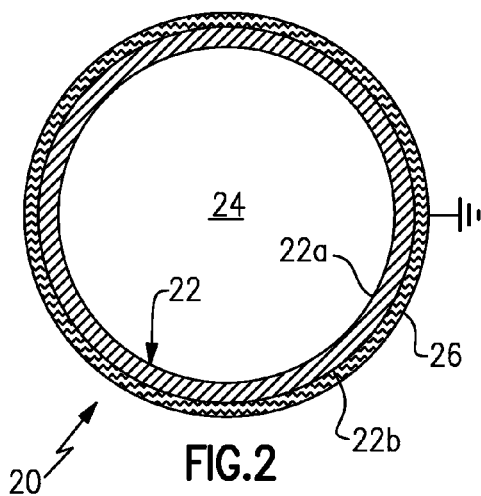
FIG. 2 illustrates a cross-section of the duct of FIG. 1, with an electrically conductive coating on the outside of the duct.

Although the duct 20 is shown with a particular geometry in this example, it is to be understood that this disclosure is applicable to ducts of any geometry with respect to length, cross-section, turns, etc. that can be formed from polymeric material. Referring also to the cross-section of the duct 20 shown in FIG. 2, the duct 20 includes a polymeric duct wall 22 (hereafter "duct wall 22") that circumscribes a fluid-conveyance passage 24. The term "polymeric" can include polymer composites as well as unreinforced polymers. The duct wall 22 has an inner surface 22a and an outer surface 22a. The duct wall 22 is non-electrically conductive. The passage 24 in this example is elongated and can serve as a conduit for the conveyance of fluids. Although shown with a circular cross-section, the cross-section can alternatively be non-circular.

Figure 3:
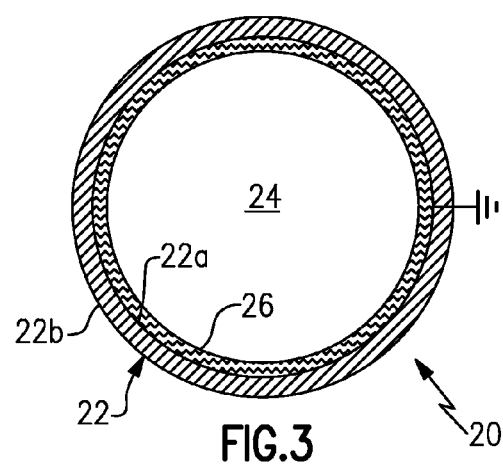
FIG. 3 illustrates an alternative from FIG. 2, in which the electrically conductive coating is on the inside of the duct.

Although the polymer of the duct wall 22 is lightweight and durable, the polymeric material can cause electric charge. In this regard, the duct 20 includes an electrically conductive coating 26 disposed on the outer surface 22b. Alternatively, the electrically conductive coating 26 can be disposed on the inner surface 22a, as shown in FIG. 3. For example, the electrically conductive coating 26 is continuous and fully or substantially fully covers the outer surface 22b or the inner surface 22a. The electrically conductive coating 26 has a greater electrical conductivity than the duct wall 22 and thus facilitates the dissipation of electric charge to a grounded component.

The duct wall 22 is fabricated of a polymeric material, which as indicated above can be an unreinforced polymer or a polymer composite. The polymeric material can include a thermoplastic polymer or a thermoset polymer. In further examples, the polymer is selected from polyphenylene sulfide, polyetheretherketone, polyetherketoneketone, polyamide, polyetherimide, aramid polymer, epoxy, and phenolic, but is not limited to these. In further examples, the polymeric material can also include one or more types of reinforcement phases, such as fiber reinforcement or other additives that are dispersed through a continuous polymer matrix phase. The reinforcement phase or phases can be continuous, discontinuous, or a combination of continuous and discontinuous reinforcement phases. In further examples, the polymer of the duct wall 22 is fiber-reinforced polyphenylene sulfide or fiber-reinforced polyetheretherketone, which may be useful in aerospace applications requiring good strength.

Figure 4:
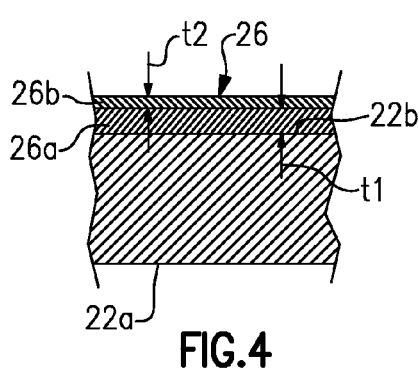
FIG. 4 illustrates a representative portion of a duct wall.

In one example, the electrically conductive coating 26 is a metallic coating. In a further example, FIG. 4 shows a representative portion of a duct. In this example, the electrically conductive coating 26 is multi-layered and includes at least a first, inner metallic layer 26a ("first layer 26a") and a second, outer metallic layer 26b ("second layer 26a"). The first layer 26a interfaces with the outer surface 22b of the duct wall 22, and the second layer 26b interfaces with the outer surface of the first layer 26a. In the alternative example of FIG. 3, the first layer 26a would interface with the inner surface 22a.

The first layer 26a and the second layer 26b cooperatively provide the duct with anti-static properties, but can also provide good adherence and durability. For example, the first layer 26a is formed of a first metal and the second layer 26b is formed of a second, different metal. The metals can be selected to provide particular properties which, together, provide good adherence, durability, strength, or other desired properties. As an example, copper is a good conductor and is used as the first layer 26a. However, copper is relatively soft and can oxidize in the presence of moisture. In this regard, a more durable and environmentally resistant metal can be selected for the second layer 26b, which overcoats and protects the first layer 26a. In one example, the second layer 26b is formed of a hard material such as electroless nickel, chrome or another suitable material, which has good strength, durability, and environmental resistance to corrosion. In further examples, the copper and nickel are pure or substantially pure metals in the respective layers 26a and 26b.

In a further example, the second layer 26b serves primarily to protect the first layer 26a. In this regard, the second layer 26b can have a thickness that is selected in accordance with the level of protection required for a given metal of the first layer 26a. In one example where copper is used for the first layer 26a in a nominal average thickness t1, the second layer 26b can be nickel with a nominal average thickness t2 that is less than t1. In a further example, the average thickness t2 is less than the average thickness t1 by a factor of at least two.

Figure 5:
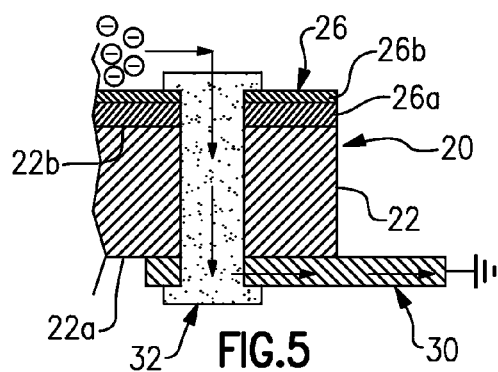
FIG. 5 illustrates a portion of a duct attached to a grounded component for electric charge dissipation.

FIG. 5 illustrates one example of how the duct 20 dissipates static electricity. In this example, the duct is secured to a grounded component 30 with at least one fastener 32 that is conductive. The fastener 32 serves as an electrically conductive bridge between the electrically conductive coating 26 and the grounded component 30. In one example, the grounded component 30 is a structural mounting feature of the duct, such as a bracket structure. In the illustrated example, the fastener 32 is a metal rivet, but is not limited to rivet fasteners.

Charge, shown with negative polarity in this example (which could alternatively be of positive polarity), is discharged from the electrically conductive coating 26, to the fastener 32, and to the grounded component 30. The electrically conductive coating 26 and the fastener 32 thus provide a dissipation path for the removal and reduction of charge. Rather than building-up as static charge on the surfaces of the duct, the charge dissipates to the grounded component 30.

The duct wall 22 can be fabricated by molding. One example molding process is suction blow molding, which can provide relatively thin walls. In this regard, the thicknesses of the first layer 26a and the second layer 26b can be further selected with regard to the thickness of the duct wall 22 to meet a given structural mechanical requirement, for example.

Using the copper and nickel as an example, the duct wall 22 can be metalized with a layer of electroless nickel over a layer of electroless and/or electrolytic copper. Other metals can be applied using similar deposition techniques, but are not limited to such techniques.

In a further example, the surface of the duct wall, i.e., the inner surface 22a or the outer surface 22b, can be treated prior to application of the first layer 26a, to enhance adhesion. Using the outer surface 22b as an example, the outer surface 22b can be subjected to an abrasive surface preparation process. An example surface preparation process includes etching the outer surface 22b to isopropyl alcohol or other solvent that at least partially dissolves the selected polymer of the duct wall 22. For instance, a wipe having the solvent can be used to apply the solvent to the outer surface 22b. The etching time can be varied depending on the selected polymer, solvent, and target etching effect, but may be between one and twenty minutes.

The outer surface 22b is then abraded. One example abrasion process includes grit blasting to increase surface roughness. An example grit blasting process includes abrading the outer surface 22b with grit blast media that has a mesh size of 80-320, at a throw pressure of 20-60 pounds per square inch, a nozzle distance from the outer surface 22b of one to four inches, and a nozzle throw angle to the outer surface 22b of 20-90°. As can be appreciated, these and other grit blasting parameters can be varied in accordance with the selected polymer of the duct wall 22 and a target surface roughness. The surface roughness facilitates mechanical bonding between the duct wall 22 and the electrically conductive coating 26.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A duct comprising:
   a polymeric duct wall circumscribing a fluid-conveyance passage, the polymeric duct wall including an inner surface and an outer surface; and
   an electrically conductive coating disposed on at least one of the outer surface and the inner surface, wherein the electrically conductive coating includes a layer of copper and a layer of nickel or chrome, the layer of copper interfacing the outer surface or the inner surface on which the electrically conductive coating is disposed and the layer of nickel or chrome interfacing the layer of copper, the layer of copper having a first average thickness and the layer of nickel or chrome having a second average thickness that is less than the first average thickness by a factor of at least 2.

2. The duct as recited in claim 1, wherein the electrically conductive coating is disposed on the outer surface.

3. The duct as recited in claim 1, wherein the polymeric duct wall includes polyphenylene sulfide.

4. The duct as recited in claim 1, wherein the polymeric duct wall includes polyetheretherketone.

5. The duct as recited in claim 1, wherein the electrically conductive coating has at least one additional layer.

6. The duct as recited in claim 1, wherein the electrically conductive coating is grounded.

7. The duct as recited in claim 1, further comprising a grounded electrically conductive bridge extending through the duct wall from the electrically conductive coating, the electrically conductive bridge dissipating electric charge from the electrically conductive coating.

8. The duct as recited in claim 7, wherein the grounded electrically conductive bridge is a fastener capable of securing the duct wall to another component.

9. A duct comprising:
   a non-electrically conductive duct wall circumscribing a passage, the non-electrically conductive duct wall including an inner surface and an outer surface, at least one of which collects electric charge;
   an electrically conductive coating disposed on one of the inner surface or the outer surface and which collects the electric charge; and
   a grounded electrically conductive bridge extending through the duct wall from the electrically conductive coating, the grounded electrically conductive bridge dissipating the electric charge from the electrically conductive coating, wherein the grounded electrically conductive bridge is a fastener capable of securing the duct wall to another component.

10. The duct as recited in claim 9, wherein the non-electrically conductive duct wall is polymeric.

11. The duct as recited in claim 9, wherein the electrically conductive coating is multi-layered.

12. The duct as recited in claim 9, wherein the electrically conductive coating includes a layer of copper and a layer of nickel or chrome, the layer of copper interfacing the outer surface or the inner surface on which the electrically conductive coating is disposed and the layer of nickel or chrome interfacing the layer of copper, the layer of copper having a first average thickness and the layer of nickel or chrome having a second average thickness that is less than the first average thickness.

13. A method for dissipating static charge in a duct, the method comprising:
   collecting electric charge at a surface of a non-electrically conductive duct wall that circumscribes a passage; and
   dissipating the electric charge from the surface using a grounded electrically conductive coating disposed on the surface, including dissipating the electric charge from the electrically conductive coating over a grounded electrically conductive bridge that extends through the non-electrically conductive duct wall, wherein the grounded electrically conductive bridge is a fastener capable of securing the duct wall to another component.

* * * * *